(No Model.)    3 Sheets—Sheet 1.
F. SCHMALTZ.
SAW SHARPENING MACHINE.
No. 598,232.    Patented Feb. 1, 1898.
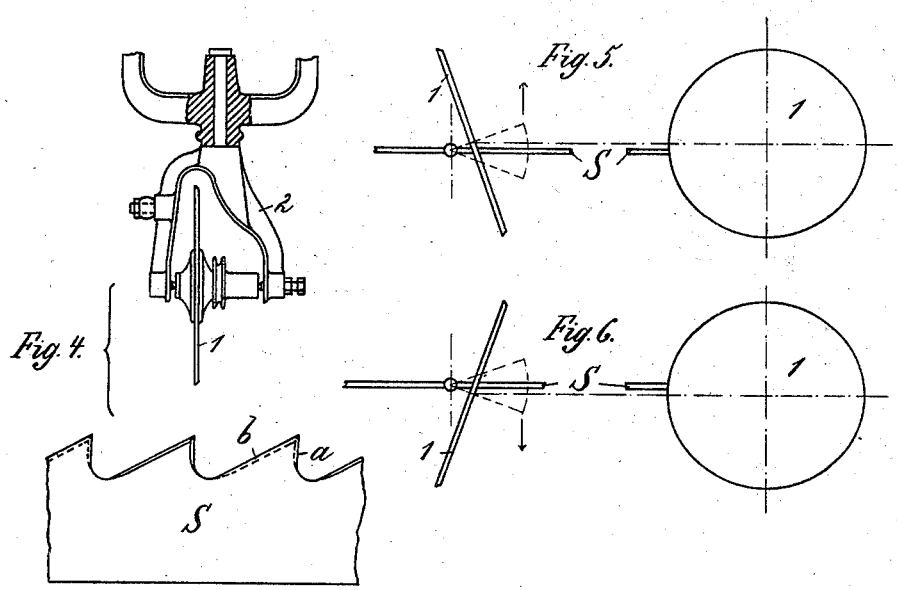
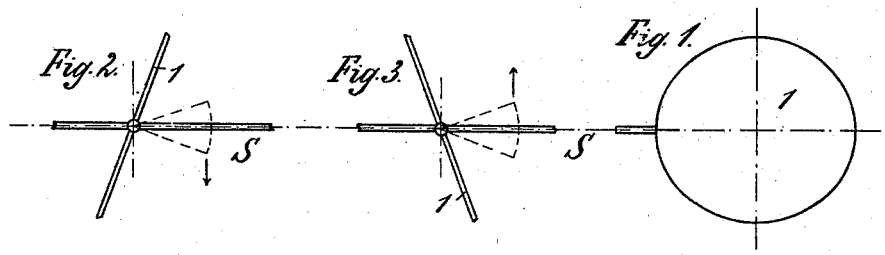
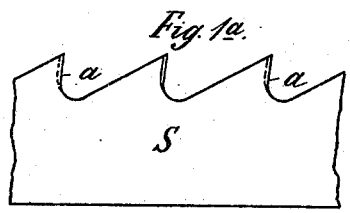

(No Model.) 3 Sheets—Sheet 2.

F. SCHMALTZ.
SAW SHARPENING MACHINE.

No. 598,232. Patented Feb. 1, 1898.

Witnesses
H. van Oldennsel
E. A. Scott

Inventor
Friedrich Schmaltz
by  Attys (No Model.) 3 Sheets—Sheet 3.
F. SCHMALTZ.
SAW SHARPENING MACHINE.
No. 598,232. Patented Feb. 1, 1898.
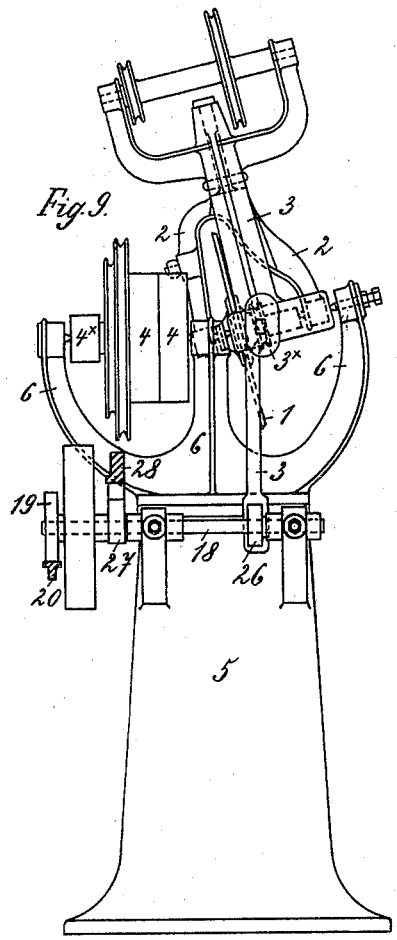
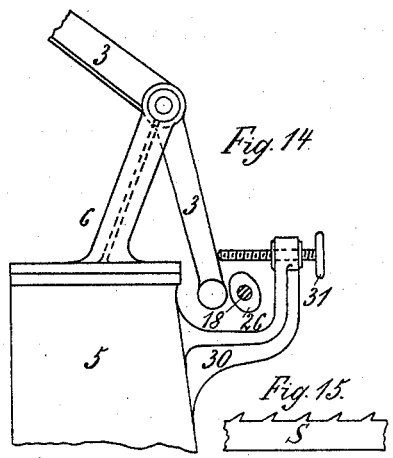
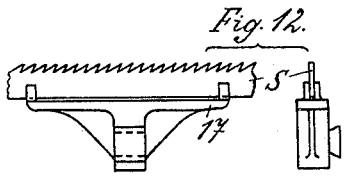
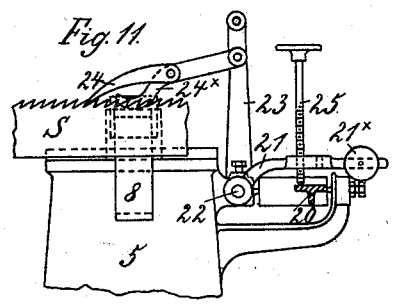
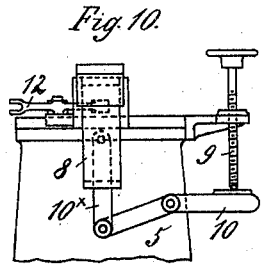
Witnesses
H. van Oldenmeel
E. A. Scott
Inventor
Friedrich Schmaltz
by
Attys

UNITED STATES PATENT OFFICE.

FRIEDRICH SCHMALTZ, OF OFFENBACH-ON-THE-MAIN, GERMANY.

SAW-SHARPENING MACHINE.

SPECIFICATION forming part of Letters Patent No. 598,232, dated February 1, 1898.

Application filed October 20, 1896. Serial No. 609,478. (No model.) Patented in Germany March 19, 1894, No. 84,159; in Hungary June 22, 1894, No. 647; in England August 13, 1894, No. 15,374, and in Austria November 15, 1894, No. 5,474.

*To all whom it may concern:*

Be it known that I, FRIEDRICH SCHMALTZ, a subject of the Emperor of Germany, and a resident of Offenbach-on-the-Main, Germany, have made certain new and useful Improvements in Automatic Saw-Sharpening Machines, of which the following is a specification.

The invention has been patented in Germany, No. 84,159, dated March 19, 1894; in Austria, No. 5,474, dated November 15, 1894; in England, No. 15,374, dated August 13, 1894, and in Hungary, No. 647, dated June 22, 1894.

The present invention relates to a machine by the means of which veneer-saws, hand-saws, circular saws, and other saws are sharpened automatically by an emery-wheel. The faces of the separate teeth are thereby ground obliquely alternately as well at their lower edge as at their back, so that each tooth will have a point with a knife-edge, whereby the cutting power of the saw is greatly increased.

With the apparatus the inclination of the saw in relation to the emery-wheel is produced in a very simple manner by the fact that while the saw remains stationary the emery-wheel placed vertically or obliquely against the same is allowed to turn around a vertical axle located outside of the plane of the emery-wheel, for by the fact that the emery-wheel swings to the right and to the left against the saw in a plane which is eccentric to its axle of suspension the said emery-wheel will not always come in contact with the same part of the saw, but, according to the position, with a part which lies outside its center and once at the right and once at the left side thereof, whereby as well the lower part of the teeth as the back thereof will have a bevel edge.

The invention is illustrated in the annexed drawings, in which—

Figure 7:
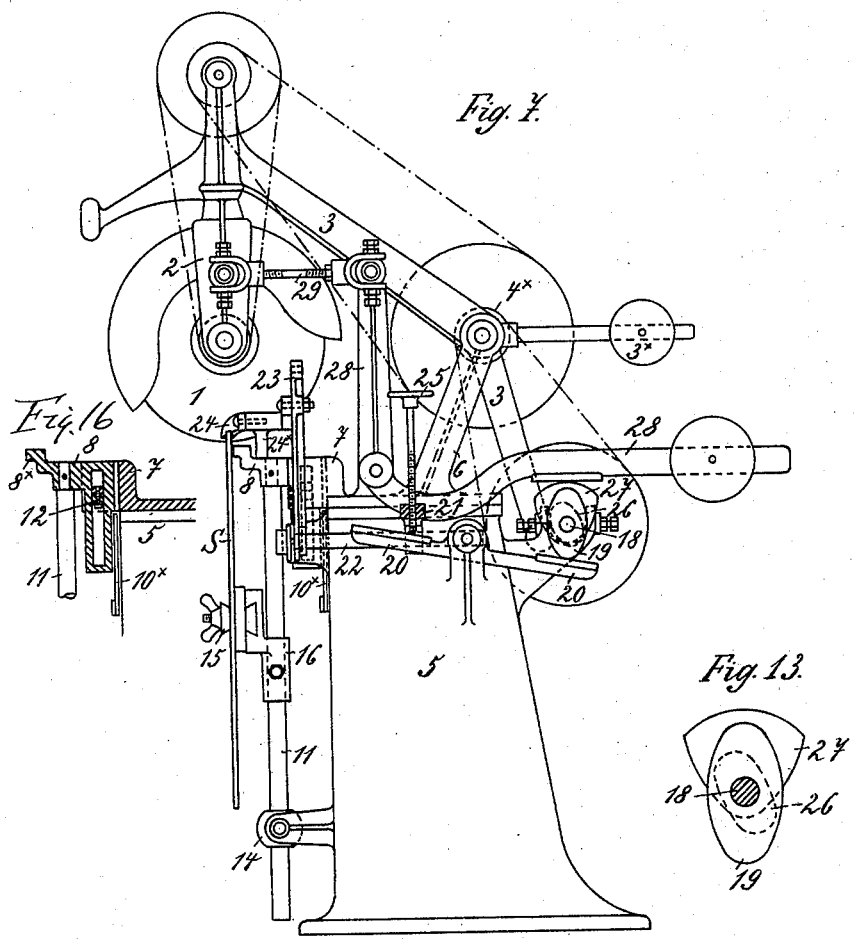
Figure 13:
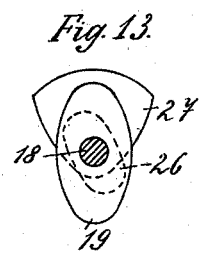
Figure 8:
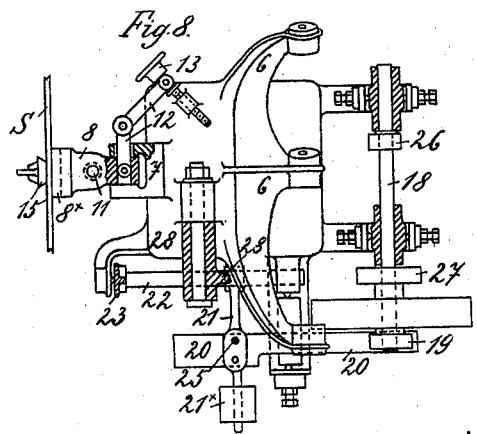

Figures 1, 1ª, 2, and 3 show an alternating oblique sharpening of the lower edge *a* of the teeth only of the saw S, the same being produced thereby that only the center of the emery-wheel comes in contact with the teeth— that is, when the wheel itself and the axle of suspension thereof lie in one and the same plane. Figs. 4, 5, and 6 show an alternate oblique sharpening of a saw S, in which the lower edges *a*, as well as the back *b*, of each tooth has a beveled edge. This sharpening is produced thereby that the emery-wheel is journaled outside of the axle of its point of suspension and in the emery-wheel arm, (see Fig. 4,) for while the emery-wheel swings alternately toward the right and the left around its axle of suspension the center of its periphery will not come in contact with the saw S below, as the latter and the axle of suspension of the emery-wheel lie in the same plane; but one part of its periphery will come in contact therewith, which is located somewhat to the right or to the left of that center, (see Figs. 5 and 6,) whereby all faces of the saw-teeth will be worked obliquely, and this oblique sharpening will become so much stronger when the emery-wheel is farther removed from the plane which must be drawn through the axle of suspension of the emery-wheel, which means that the more eccentrically the same lies in relation to its axle of suspension the greater the bevel will be. Of course during this oblique sharpening the emery-wheel must be moved up and down in order that all the teeth come successively in contact with the wheel while the saw advances. Such automatic saw-sharpening machine, with all mechanical parts required for the effecting of the oblique sharpening shown in Figs. 4, 5, and 6, is illustrated in the subsequent drawings. Fig. 7 is a side view of the same; Fig. 8, a plan view thereof, partly in section; and Fig. 9, a rear view. Figs. 10, 11, 12, and 13 illustrate details, while Fig. 14 shows an apparatus which enables to sharpen saws with a larger base of teeth, as shown as a whole in Fig. 15. Fig. 16 is a detail view of the support for the saw.

The emery-wheel 1, serving for sharpening the teeth of the saw, the axle of which is journaled in a strap 2, suspended in an arm 3, equilibrated by a counterweight 3ˣ, is put in rotary motion by means of the belt of the driving-pulleys 4. These pulleys 4, one of which is fixed and the other loose upon a shaft, are journaled upon double pedestals 6, suitably arranged in the lower frame 5 of the machine. These double pedestals hold at the same time the arm of the emery-wheel 3 between two points and impart the motion to the said emery-wheel and all other parts of the machine by means of a belt or strap pulley mounted upon their axle. The pedestal 6 is further provided on one side with piece 7, in which a sliding piece 8 can be moved up and down by means of an adjusting-screw 9 and an angular lever 10 with connecting-piece $10^\times$ in order to adjust the position of the saw-holding piece $8^\times$, and consequently of the saw S, in relation to the emery-wheel, said saw-holding piece being mounted on the front part of the sliding piece 8, and in order that the sliding piece 8 can also move fore and backward, which is necessary considering the different thicknesses of the saws S, which are fixed upon the rod 11, connected with the sliding piece 8, a slit is provided laterally in the bracket-piece 7, Fig. 8, through which an angular lever 12, connected with the sliding piece 8, engages, which can be operated in such a manner by the adjusting-screw 13, pivoting upon the frame of the machine, that the slide-piece 8 and at the same time cheek $8^\times$ can be adjusted to correspond with all thicknesses of saws. The one extremity of the rod 11, upon which the saw is fixed, is rigidly connected with the sliding piece 8, and its other end slides freely in a bracket 14, mounted upon the frame 5 of the machine. The circular saws are secured upon a spur 15, which can move up and down upon the rod 11 through the intermediary of the sliding piece 16 and can be fixed upon the same. The veneer-saws or the band-saws are journaled in a fork 17, Fig. 12, which is also connected with the sliding piece 16 through the intermediary of a dovetailed piece, and therefore can also move up and down and be fixed at the right position upon the rod 11. Thus the position of the saw can accurately be adjusted by means of the adjusting-screw 9 if such be necessary on account of the wearing out of the emery-wheel.

The feeding mechanism for the saw is operated by a shaft 18 on the frame, which is connected by means of belts with a small belt-pulley $4^\times$, rigidly mounted upon the axle of the driving-pulley 4. Upon the shaft 18 are mounted several eccentric or curved sheaves, of which one operates the feeding of the saw, another the revolving to the right or to the left of the emery-wheel, and still another the up-and-down motion of the arm of the emery-wheel, together with the emery-wheel itself. The eccentric 19, which serves for the feeding of the saw S, is a double eccentric which during one revolution of its axle 18 operates twice the eccentric-lever 20, belonging thereto. A lever 21, operated by a weight $21^\times$, rests upon the eccentric-lever 20, Figs. 8 and 11, which can be moved to the left and to the right upon its axle of revolution 22 and can be tightened by binding-screws. There is, further, connected with the axis of revolution a lever 23, Figs. 7, 8, and 11, to which the properly-called "feed-pawl" 24 is attached, which engages in the teeth of the saw and makes the saw advance for the space of one tooth when the eccentric-lever 20 is driven upward or pressed downward by the eccentric 19. In order to prevent the feed-pawl from dragging over the entire length of the back tooth, I have provided a shoe $24^\times$, which moves to and fro upon the sliding piece 8, and in order to enable the operator to accurately adjust the pawl 24, no matter what be the distance between the teeth from one point to the other, the lever 21, provided with the counterweight $21^\times$, is arranged so that it can move to the right and to the left, so that when moved toward the left upon the axle 22 this lever, together with the lever 23 and the pawl 24, will travel a greater distance during the going up and down of the eccentric-lever 20 than when the lever 21 is moved to the right upon the axle 22. In this case the lever 21 comes nearer the pivotal point of the eccentric-lever 20 and has therefore a less amplitude of travel, and, further, in order that when the saw is being sharpened the lower edge of each tooth come in contact with the emery-wheel I have provided an adjusting-screw 25 in the lever 21, Figs. 7, 8, and 11, which when tightened or untightened will lift or lower the lever and makes the pawl 24 engage sooner or later in the clearance between each two teeth and makes the saw advance, for it being a fact that the pawl 24 always engages in the next following space between the teeth and that this movement depends upon how the lever 21 is adjusted upon its axis of rotation 22, no matter what the size of the teeth may be, the sooner or later engaging of the pawl 24 can be effected only by adjusting the adjusting-screw 25, whereby the saw will also be displaced somewhat sooner or later, or, in other words, the separate teeth will not be moved as far over the emery-wheel 1, and if the separate teeth of the saw are not moved too far over the emery-wheel 1 the latter will of course come in contact with the lower edge of the teeth and will grind and sharpen the same, or, briefly, if the adjusting-screw 25 is turned to the left the pawl 24 will also move to the left and the saw will not be pressed forward so much. The lower edge of each tooth will thereby come in contact with the emery-wheel 1 and will be attacked more than when the adjusting-screw 25 is turned to the right, as in the latter case the emery-wheel will not attack so strongly the lower edge of the teeth. The eccentric 26, which is also fixed upon the shaft 18 and is also a double eccentric, effects the up-and-down motion of the emery-wheel 1, so that the arm 3 of the emery-wheel is prolonged over its pivotal point and bears against the eccentric 26 in order that the latter may operate the same, and as the end of the arm 3, from which the emery-wheel 1 is suspended pivotally around an axle, is heavier than the prolongment of the arm 3 the arm of said emery-wheel will always touch the surface of the corresponding eccentric 26. A curved sheave could of course be used instead of the eccentric. The position of the eccentric 26 in relation to the eccentric 19 is such that the former has always a small lead on the latter, Fig. 13, in order to enable that the emery-wheel 1 has already commenced to remove from one tooth-space before the mechanism for feeding the saw commences to work. There is, further, on the shaft 18 a third eccentric 27, or, eventually, instead thereof a curved sheave, which operates the angular lever 28, journaled upon the frame of the machine and provided with a counterweight, and at the same time the emery-wheel 1, connected therewith by the connecting-rod 29, Fig. 7, and rotating around its axis of suspension, for while the arm of the angular lever 28, upon which a counterweight is mounted, is pressed upward by the eccentric 27 the connecting-rod 29, which is connected with the other arm of said angular lever, turns the emery-wheel around its axis of suspension and puts the same in an inclined position in relation to the position of the saw S below, whereby an oblique grinding of the corresponding saw-teeth, more especially of the lower edge thereof, is effected, and when the eccentric 27 rotates further, and as a consequence thereof the counterweight depresses the angular lever 28 or brings the same in another position, the emery-wheel and all mechanical devices connected therewith will be drawn so far in an opposite oblique position that the lower edge of the subsequent tooth will be sharpened at the side opposite to that of the tooth which was sharpened before. The change from one position to the other of the emery-wheel is not a sudden, but a gradual change. It commences shortly after the emery-wheel has commenced to go down and is accomplished as soon as it has sharpened one clearing between two teeth. The emery-wheel and the arm 3 go up and down, and only after this the emery-wheel turns, and that makes that it turns as soon as it has released the tooth.

In order that the lower edge of each separate tooth be suitably sharpened, the emery-wheel is journaled in such a manner upon the pedestal 6 that its plane is somewhat inclined in relation to a horizontal plane, as shown in Fig. 9.

In order to be able to sharpen saws with teeth having a greater or smaller base, an apparatus has been constructed whereby the emery-wheel can be stopped during its descending course, thus keeping it for a longer time in contact with the base or bottom of the corresponding saw-tooth. To that effect an angular arm 30 has been arranged upon the frame of the machine, Fig. 14, in which a set-screw 31 is used, by means of which the arm 3 of the emery-wheel, and together therewith the emery-wheel itself, will be stopped or limited in its motion. I mean the descending motion of the emery-wheel will be stopped, and a longer base, Fig. 15, will be ground between the teeth.

I claim—

1. A saw-grinding machine comprising an emery or like grinding wheel, a swiveled support therefor, and means for turning said support with the wheel to make the same assume different angular positions in relation to the saw, said wheel being arranged to one side or eccentric in relation to the pivot of the support, substantially as described.

2. In combination, with means for holding the saw, the grinding-wheel, a support having movement to move the wheel to and from the saw, a swiveled bracket in the said support and carrying the wheel eccentrically and means for operating the bracket, substantially as described.

3. In combination, the grinding-wheel, with operating means therefor, the saw-feeding pawl and the means for operating the pawl comprising the two levers, 20 21, one of which extends across the other and one of which is adjustable in relation to the other to vary the movement of the pawls, substantially as described.

4. In combination, the grinding-wheel, with operating means therefor, the saw-feeding pawl and operating means therefor comprising the two levers 20, 21, one of which extends across the other and the latter of which is adjustable in relation to the other along its shaft, and the adjusting-screw 25 forming the contact between the two levers, connections between the levers and the pawl and means for operating the levers.

5. In combination with the grinding-wheel, with its support and operating means, the saw-guide 8, means for raising it consisting of the set-screw, the lever and link, means for adjusting the guide laterally consisting of the lever 12, and adjusting-screw, the bar 11 connected with the guide, the adjustable block thereon and means for clamping the saw to said block, the lower end of said rod sliding freely in a block 14, substantially as described.

6. In combination with means for holding the saw, the grinding-wheel, the arm supporting the same, the cam operating against the arm, the bracket 30 and the screw-rod threaded in the bracket and having its end adapted to contact with the end of the arm to hold said end momentarily stationary while the cam continues to revolve, substantially as described.

In testimony whereof I have hereunto subscribed my name in presence of two witnesses.

FRIEDRICH SCHMALTZ.

Witnesses:
 FRANK H. MASON,
 JEAN GRUND.